United States Patent
Abou-Nasr et al.

(10) Patent No.: US 9,953,317 B2
(45) Date of Patent: Apr. 24, 2018

(54) METHOD AND SYSTEM FOR SECURE KEY ROTATION

(71) Applicant: Shopkeep.com., Inc., New York, NY (US)

(72) Inventors: Yasser Abou-Nasr, Chino Hills, CA (US); Michael Boland, Souderton, CA (US)

(73) Assignee: Shopkeep.com, Inc., New York, NY (US)

( * ) Notice: Subject to any disclaimer, the term of this patent is extended or adjusted under 35 U.S.C. 154(b) by 975 days.

(21) Appl. No.: 13/798,832

(22) Filed: Mar. 13, 2013

(65) Prior Publication Data

US 2014/0279557 A1    Sep. 18, 2014

(51) Int. Cl.
*G06Q 20/34* (2012.01)
*G06Q 20/38* (2012.01)

(52) U.S. Cl.
CPC ......... *G06Q 20/3829* (2013.01); *G06Q 20/34* (2013.01)

(58) Field of Classification Search
CPC ....................................................... H04L 9/08
USPC ....................................................... 705/71
See application file for complete search history.

(56) References Cited

U.S. PATENT DOCUMENTS

| | | |
|---|---|---|
| D401,231 S | 11/1998 | Schechtman et al. |
| 6,088,682 A | 7/2000 | Burke |
| D436,580 S | 1/2001 | Navano et al. |
| 6,441,808 B1 | 8/2002 | Hashimoto |
| 7,171,370 B2 * | 1/2007 | Burke .................... G06Q 20/04 235/375 |
| 7,353,181 B2 | 4/2008 | Musso |
| 7,697,920 B1 | 4/2010 | McClain |
| 8,099,727 B2 | 1/2012 | Bahat et al. |
| D656,946 S | 4/2012 | Judy et al. |
| D657,368 S | 4/2012 | Magee et al. |
| 8,195,656 B2 | 6/2012 | Grasset |
| 8,245,037 B1 * | 8/2012 | Durgin .................. G06F 21/602 380/286 |
| D667,838 S | 9/2012 | Magee et al. |
| 8,321,925 B1 * | 11/2012 | Durgin ................ G06F 21/6209 713/172 |
| D673,165 S | 12/2012 | Ospina Gonzalez |
| D678,306 S | 3/2013 | Philopoulos |
| D682,855 S | 5/2013 | Iden |
| 8,504,844 B2 * | 8/2013 | Browning ......... G06F 17/30286 713/189 |
| D689,086 S | 9/2013 | Philopoulos |
| D690,721 S | 10/2013 | Tee et al. |
| 8,646,685 B2 * | 2/2014 | Bishop ................... G06Q 20/02 235/379 |
| 9,002,018 B2 * | 4/2015 | Wilkins .................. H04L 9/006 380/281 |
| 2004/0103282 A1 * | 5/2004 | Meier ................ G06Q 20/3674 713/171 |
| 2004/0254676 A1 | 12/2004 | Blust et al. |
| 2006/0031237 A1 | 2/2006 | Deanna et al. |
| 2006/0258337 A1 | 11/2006 | Fujita et al. |

(Continued)

*Primary Examiner* — Bruce I Ebersman
(74) *Attorney, Agent, or Firm* — Ted Sabety; Sabety + associates, PLLC

(57) ABSTRACT

This invention discloses a novel system for securing and using payment token data in a system for processing electronic payment transactions that does not require down-time for rekeying encryption keys when the keys are rotated.

8 Claims, 10 Drawing Sheets

(56) References Cited

U.S. PATENT DOCUMENTS

| | | |
|---|---|---|
| 2010/0106651 A1 | 4/2010 | Tate |
| 2010/0125509 A1 | 5/2010 | Kranzley et al. |
| 2010/0198728 A1* | 8/2010 | Aabye .................. G06Q 20/40 705/44 |
| 2011/0225055 A1 | 9/2011 | Takahasi |
| 2011/0251892 A1 | 10/2011 | Laracey |
| 2012/0066363 A1 | 3/2012 | Somogyi et al. |
| 2012/0160912 A1 | 6/2012 | Laracey |
| 2014/0229737 A1* | 8/2014 | Roth ....................... H04L 9/088 713/176 |

* cited by examiner

METHOD AND SYSTEM FOR SECURE KEY ROTATION

FIELD OF INVENTION

The present invention generally relates to the field of credit card and electronic payment security.

BACKGROUND

Electronic payment systems rely on data encryption in order to secure the data tokens used by consumers and merchants to authorize payment. Credit card numbers are particularly sensitive data because a complete card number, and its attendant data, can be submitted by anyone for purchase. Similarly, any other kind of payment authorization token suffers the same vulnerability. At the same time, merchants operating computerized sales transaction systems have a need to store this sensitive data for periods of time. In some cases, the customer agrees that the merchant can store the credit card in order that consumer enjoy the convenience of not re-entering the numbers into their browser interface operating on their computer. Industry best practices dictate that storage of credit card numbers and any other type of payment authorization token be secured by means of encrypting the data. However, encryption simply shifts the data security vulnerability from the data itself (which is now encrypted) to the security of the keys. One solution is that the data encryption keys (DEK) be changed periodically. During that process, all of the encrypted data needs to be re-keyed. This means that the system's day to day business operation is suspended while new encryption keys are generated and each encrypted data item in the payment token database is decrypted with the old key and re-encrypted with the new one. This process, commonly referred to as key rotation and re-keying can cause disruption of business operations.

Therefore, there is a need for a key rotation mechanism that permits the electronic transaction to continue to operate during the key rotation and re-keying process. These and other objects, features and characteristics of the present invention will become more apparent to those skilled in the art from a study of the following detailed description in conjunction with the appended claims and drawings, all of which form a part of this specification. It should be understood that the description and specific examples are intended for purposes of illustration only and not intended to limit the scope of the present disclosure.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
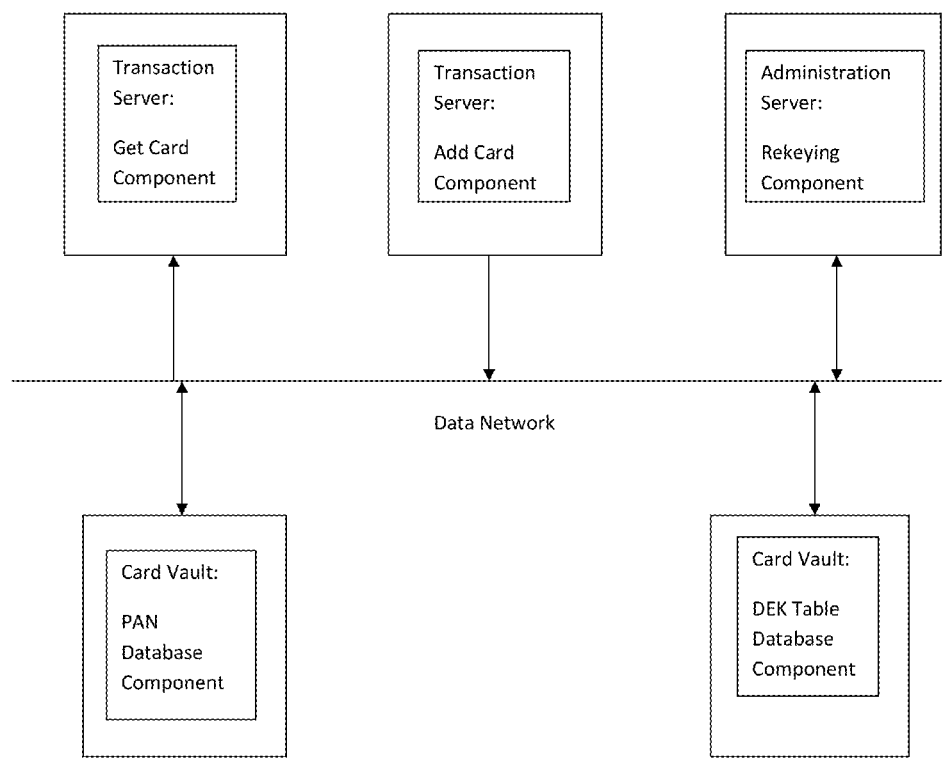
FIG. 1. System components.

The system is comprised of a card vault component, which contains encrypted information about customers, including payment information. Referring to FIG. 1, the customer information, which includes the Primary Account Number (PAN) is input into the system. The PAN can be a credit card number. The PAN can also be any other alpha-numeric string representing an authorization for payment. In one embodiment, the PAN values for customers are stored in a database with other related customer data, the PAN database or PAN table. The PAN values are only stored after they are encrypted. In one embodiment, the PAN values are encrypted twice, one with a first data encryption key (DEK1) and the other with a second data encryption key (DEK2). Both versions of the encrypted PAN value are stored in the database. The database may be organized as a table, and then referred to as the PAN table. In this system, another database stores the data encryption keys, or DEKs. The data encryption keys themselves are stored in encrypted form, using another key called the Key Encryption Key or KEK. The DEKs are stored in a database, typically in the form of a table, or DEK table, that associates the encrypted DEK with an identifier or DEK ID.

In a typical key rotation, the entries in the DEK table will be changed so that the existing first DEK or DEK1 is prepared to be discarded, the key DEK2 remains and a new DEK, or DEK3 is generated, encrypted with the KEK and inserted into the table with its new DEK ID. The object of rekeying is so that the PAN data that is encrypted with the DEK1 key is decrypted first before the DEK1 key is discarded and then re-encrypted with the new DEK key, referred to here as DEK3. The prior art rekeying operation entails stopping all transactions while the system decrypts each PAN entry in the PAN table and re-encrypts it with the new DEK3, and inserts that value into the PAN table. After the rekeying, the PAN table contains two entries for the encrypted PAN, one using the DEK2 encryption key and the DEK3 encryption key. After re-keying, the DEK1 key entries may be discarded.

Figure 2:
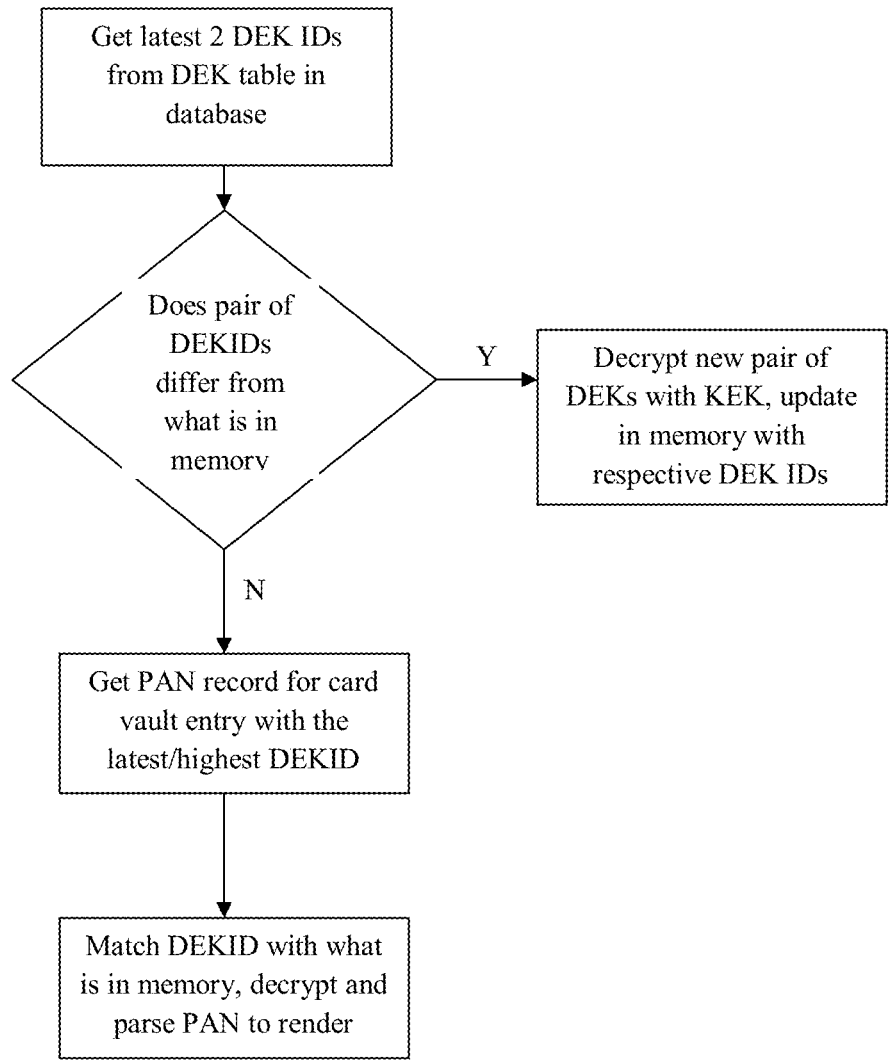
FIG. 2. Transaction Server adapted for rendering encrypted card data
FIG. 3. Transaction Server adapted for storing encrypted pan data
FIG. 4. Rekeying Server process.

One embodiment of the invention where a system is adapted to process the DEK keys so that key rotation and rekeying can occur while the system is still processing payment transactions. FIG. 2 depicts a transaction server component of the system adapted for the process of getCard, for fetching the encrypted payment token, for example, a credit card number, from the database and decrypting it. In this embodiment, the two DEK keys which when stored in the database in encrypted form, are decrypted but only stored in the data memory of the servers that are processing transactions. This is so that the process of fetching a DEK ID, an encrypted DEK and KEK from the DEK table database does not need to be performed on each transaction, which slows the entire system down. Other embodiments include storing the unencrypted DEKs in the CPU stack, CPU registers, cache memory, main memory or other memory that is not readily accessible by other systems or processes other than the CPU of the server itself operating an authorized process. The decrypted DEKs stored in memory are also locally stored with their corresponding DEK IDs.

In this embodiment, the latest two DEK IDs for the currently used DEKs are fetched from the DEK table. The fetched DEK IDs are used to check whether the pair matches the DEK IDs of the decrypted DEKs stored in memory. If the pair of DEK IDs does not match the pair of DEK IDs in memory, then the current two DEKs are fetched from the database, decrypted with the KEK and updated in memory. In some cases, one of the two DEKs retrieved is simply the overlapping DEK that already resides in memory, which occurs during a key rotation. However, in that case, where one of the two DEK IDs, match, then the system can fetch the PAN record from the card vault database with the latest or highest DEK ID, e.g. DEK3. That PAN record will also include the entry corresponding to the DEK ID that is one generation older, e.g. DEK2. This condition occurs when the DEK3 has been generated and is in the process of rekeying into the PAN database. Nonetheless, the DEK2 entry is still valid and may be used by the transaction server to decrypt the PAN and process the transaction. The validity is determined because the DEK ID for DEK2 in memory matches the DEK ID in the DEK table. The decrypted DEK2, which is already in memory, can be used to complete the transaction. This condition, where the DEK2 is still usable and the DEK3 has not been placed in main memory, can continue until the DEK ID for DEK2 is not used anymore, that is, upon the next key rotation, which case the prior condition, no DEK IDs matching, requires the transaction server to fetch the new keys from the database.

Figure 3:
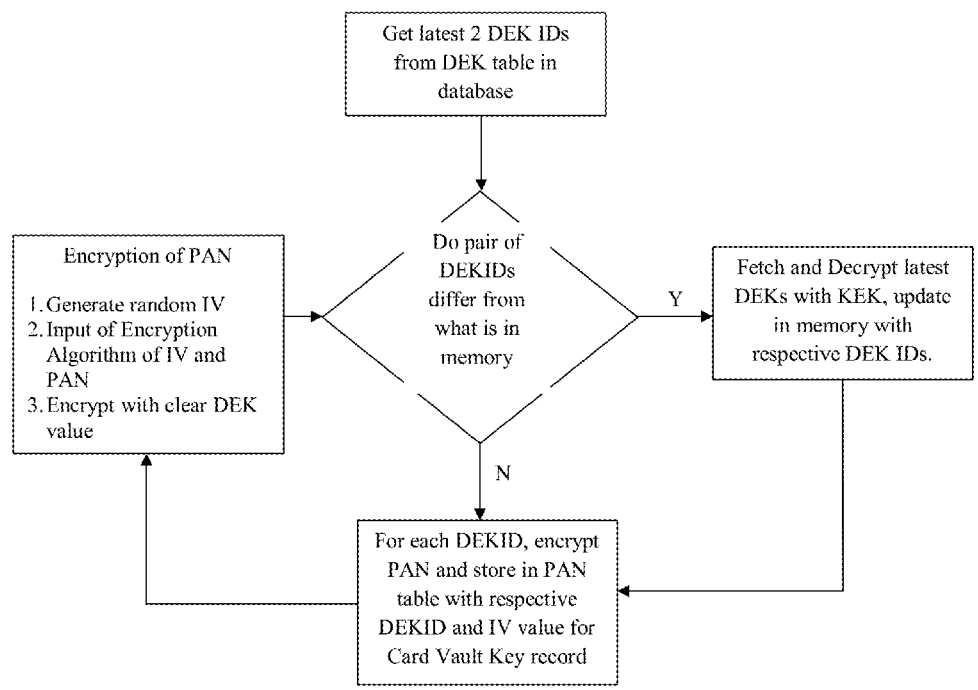

Another embodiment of the system has a component adapted so that the system can accept a payment token, for example, a card number input by a user and insert that into the PAN database or table. FIG. 3 shows the process, further described as follows. The server fetches the latest two DEK IDs from the database. It then tests for the condition whether the pair of DEK IDs stored in memory matches the DEK IDs retrieved from the database. If not, the two DEKs are fetched and decrypted and the memory locations updated. However, if they do match, that step is skipped. Control flow thereby arrives at the step of encrypting the payment token, or PAN entry, and storing the result in the respective PAN table entry with the DEK ID and Initialization Vector (IV) value for the Card Vault Key that was used. In this step, the system generates a random IV to be used for the encryption of the PAN, and the result is encrypted with the clear DEK present in memory. With this system component, the system can continue to accept payment tokens and enter them into the PAN using the two DEKs in memory. During rekeying, the overlapping key, e.g. the DEK 2 is still present. The DEK3 entries into the PAN will be updated by means of a separate re-keying process operating independently of the transaction server. This embodiment allows a user to enter new cards in the system regardless of the rekeying state. With this embodiment, the end result is all new entries in the system will be stored encrypted with the latest two DEK IDs such that one of the DEK IDs will be an overlap from the previous generation DEK IDs and the new generation of DEK IDs. During the rekeying process, if this card vault record has a PAN entry with the latest DEK ID, it will be skipped. However, if it doesn't, it will be picked up so that the oldest DEK from the last generation keys is rekeyed with the latest DEK ID in the system.

Figure 4:
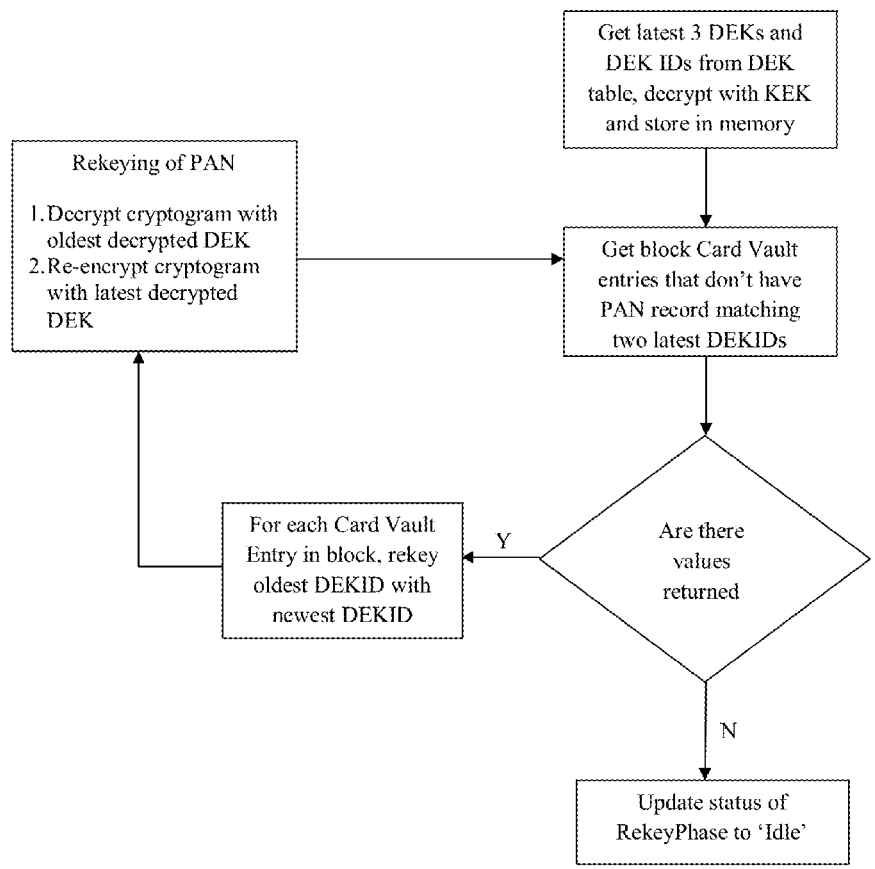
Figure 5:
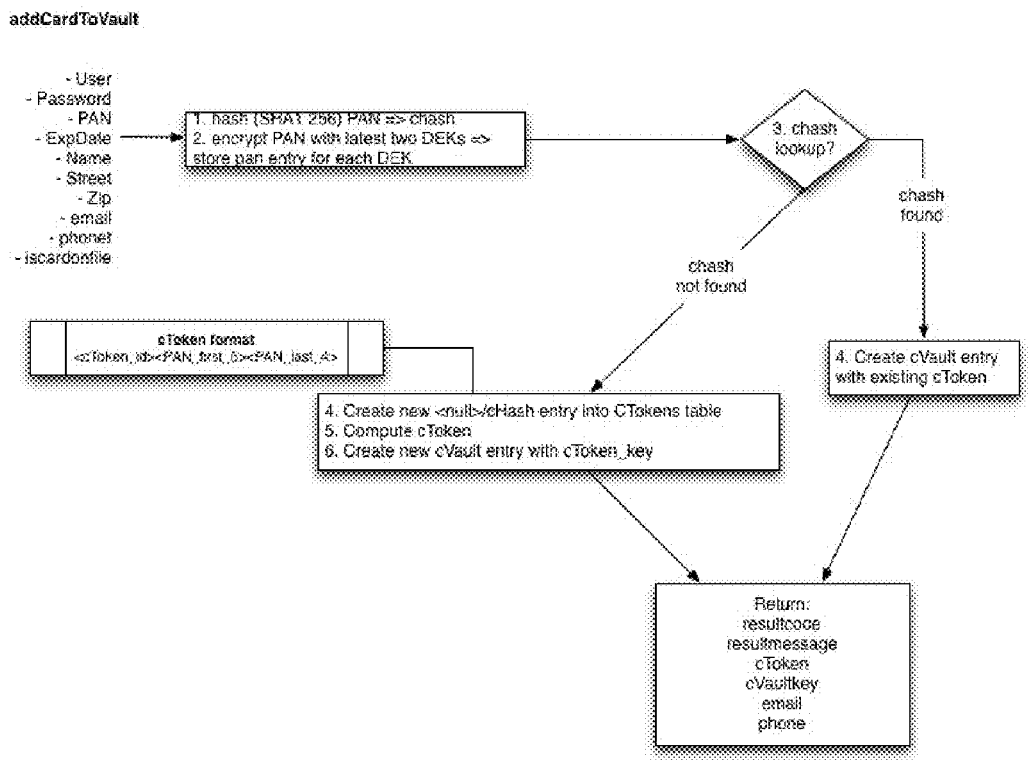
FIG. 5. AddCard process.
Figure 6:
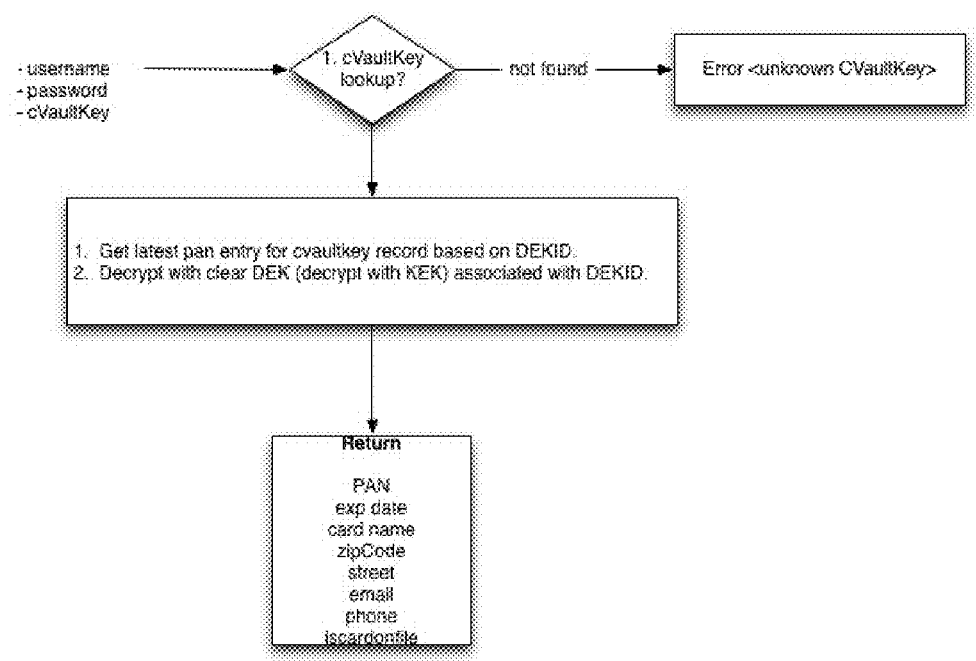
FIG. 6. InfoCard vault process.
Figure 7:
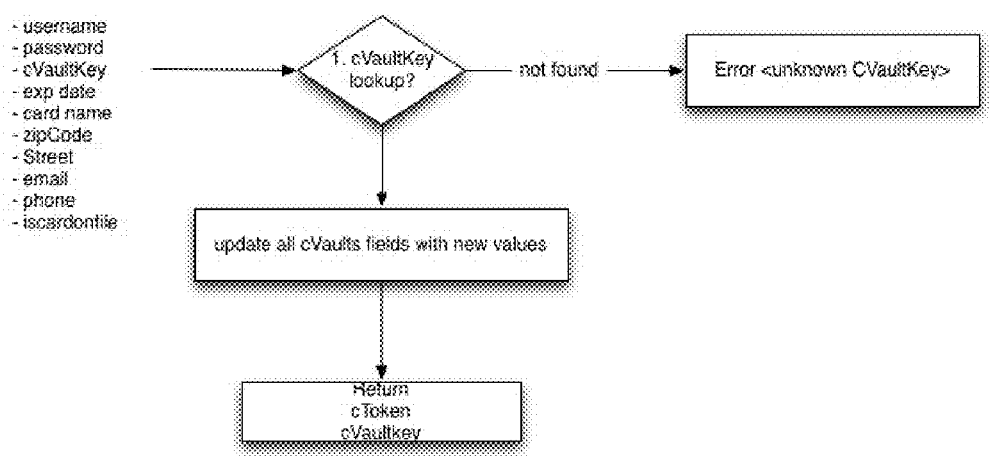
FIG. 7. Update card vault process.
Figure 8:
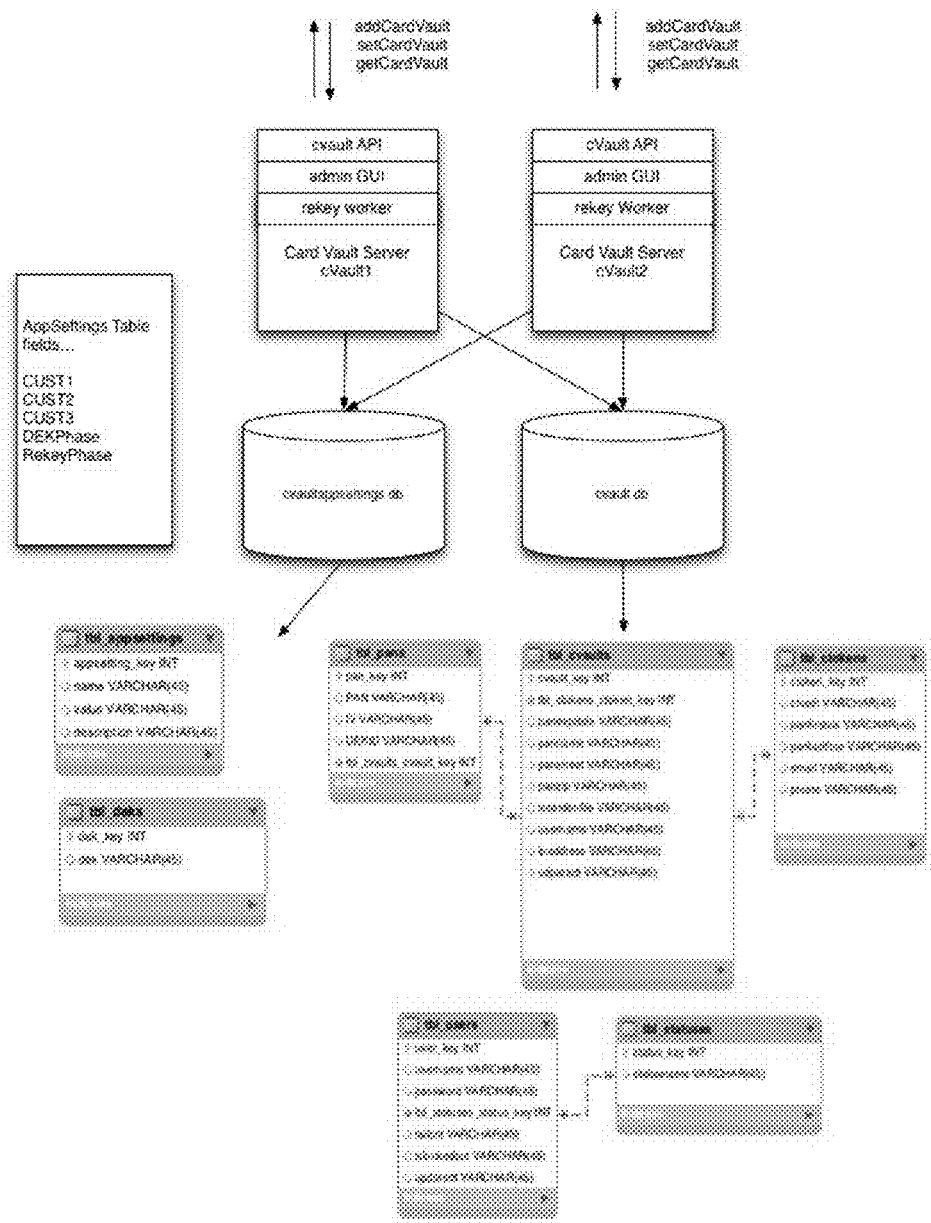
FIG. 8. Embodiment of database storage.
Figure 9:
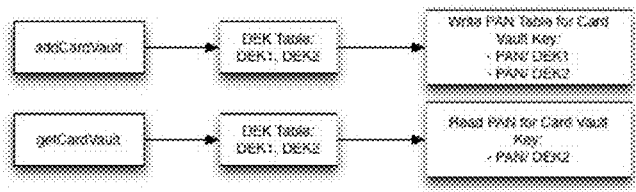
FIG. 9. Key Rotation process states.
Figure 9:
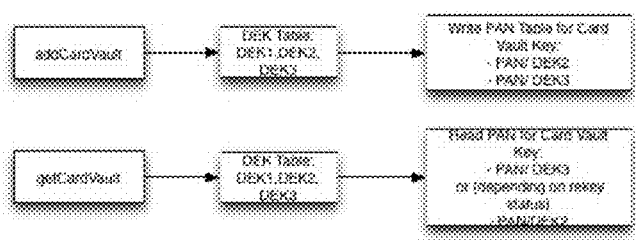
Figure 9:
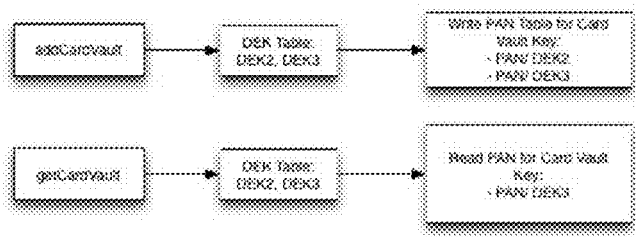
Figure 10:
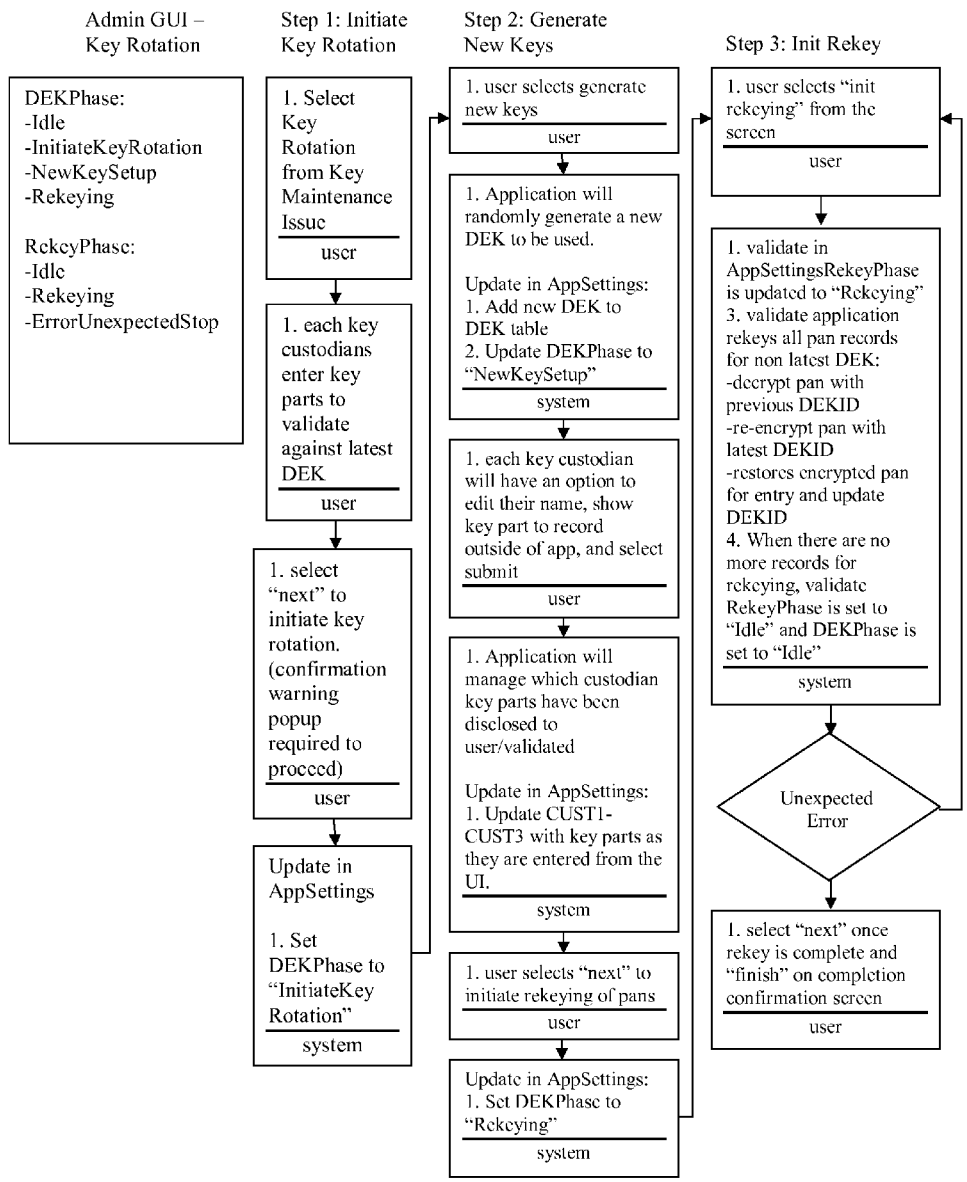
FIG. 10. User interface flow.

The system is also comprised of an administration server that is adapted to process the rekeying component of the system independently of the transaction servers. This component of the system systematically updates the PAN table entries using the new DEK3 and DEK3 ID. FIG. 4 shows the system component adapted for rekeying. The system fetches the latest three DEKs from the DEK table and decrypts them with the KEK. The new generated DEK ID and the last two from the previous generation of DEK IDs. The decrypted values are stored in the memory of the rekeying server. The server marches through the card vault database looking for PAN entries where the PAN record does not have a DEK ID that matches the latest DEK ID, that is, the DEK ID for DEK3. If the result of this query is not null, then for each of these card vault entries, the older DEK1 is used to decrypt the PAN entry corresponding to DEK ID for DEK 1. Then this data is re-encrypted using DEK3 and re-stored into the database. This process continues until the database query returns a "null", which means the rekeying is complete. An important aspect of the system is that the next DEK in line for rotation and rekeying, e.g. DEK 2, cannot be rotated until the rekeying process is complete.

Practitioners of ordinary skill will recognize that the components of the system can be embodied as separate processes operating on physically separate servers as well as different processes operating on the same physical servers in various combinations. In the typical system, the transaction servers and administration server components may be processes operating on the same physical hardware, but the card vault database and the DEK database may be physically distinct.

Operating Environment:

The system is typically comprised of a central server that is connected by a data network to other computers. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Further, a server may be virtual, whereby several software instances each operating as an independent server are housed in the same hardware computer. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The system and method described herein can be executed using a computer system. The system may be comprised of one or more components, each generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-browsers or natively executed by local applications or apps) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Also, while processes or blocks are at times shown as being performed in series, these processes or blocks may instead be performed or implemented in parallel, or may be performed at different times.

What is claimed:

1. A computer system for executing electronic payment transactions while conducting a key rotation and re-keying comprising:

a transaction server comprised of memory comprised of a first decryption key and a second decryption key corresponding to a first key identifier and a second key identifier stored in the memory, the transaction server further comprised of a data structure representing a key table, said key table comprised of data representing a third key identifier and a fourth key identifier;

the transaction server further comprised of logic configured to:

receive from the key table the third key identifier and the fourth key identifier;

receive a first encrypted data representing a first payment token encrypted by a third encryption key and a second encrypted data representing the first payment token encrypted by a fourth encryption key, each of the third and fourth encryption keys corresponding to the third and fourth key identifiers comprising the key table;

determine which one of either the third or fourth key identifiers correspond to the first or second key identifiers;

select one of the first or second received encrypted data that corresponds to the determined one of the third or fourth key identifiers; and decrypt the selected received encrypted data using the one of the first or second decryption keys whose key identifier was determined to correspond to the third or fourth key identifier; and a keying server comprised of logic configured to:

receive the first and the second key identifiers, where the first key identifier corresponds to the youngest of the first or second encryption keys;

receive the third and the fourth key identifiers;

receive the first encrypted data and the second encrypted data;

determine whether the pair of third and fourth key identifiers fail to correspond to the pair of first and second key identifiers, and in dependence on such determination, decrypting whichever of the first or second encrypted data corresponds to the fourth key identifier and re-encrypting the decrypted data using the first encryption key that corresponds to the younger of the first or second encryption keys.

2. The system of claim 1 where the transaction server is further comprised of logic configured to:

receive the first payment token;

receive the second and the third key identifiers;

encrypt the first payment token with the encryption key associated with the second key identifier;

input the encrypted first payment token into a data record entry corresponding to the first payment token, said entry further corresponding to the second key identifier, where the first and second key identifiers are numerically distinct and the first and second encryption keys are numerically distinct.

3. The system of claim 1 where the transaction server is further comprised of logic configured to:
   determine if neither the first nor second key identifiers match either the third or fourth key identifiers, and in dependence thereon, request from a remote server server and receive from said remote server encrypted forms of the third decryption key and the fourth decryption key corresponding to the third and fourth key identifiers.

4. The system of claim 3 further comprised of logic configured to prevent the key rotation and rekeying until the system detects a condition that the request from said remote server step returns a null result instead of the third and fourth decryption keys.

5. A method executed by a computer system for executing electronic payment transactions while conducting a key rotation and re-keying, the computer system comprised of a transaction server comprised of memory comprised of a first decryption key and a second decryption key corresponding to a first key identifier and a second key identifier and a data structure representing a key table and a keying server comprising:
   at the transaction server,
   storing in the key table a third key identifier and a fourth key identifier;
   receiving a first encrypted data representing a first payment token encrypted by a third encryption key and a second encrypted data representing the first payment token encrypted by a fourth encryption key, each of the third and fourth encryption keys corresponding to the third and fourth key identifiers comprising the key table;
   determining which one of either the third or fourth key identifiers correspond to the first or second key identifiers;
   selecting one of the first or second received encrypted data that corresponds to the determined one of the third or fourth key identifiers; and
   decrypting the selected received encrypted data using the one of the first or second decryption keys whose key identifier was determined to correspond to the third or fourth key identifier; and
   at the keying server,
   receiving the first and the second key identifiers, where the first key identifier corresponds to the youngest of the first or second encryption keys;
   receiving the third and the fourth key identifiers;
   receiving the first encrypted data and the second encrypted data;
   determining whether the pair of third and fourth key identifiers fail to correspond to the pair of first and second key identifiers; and
   in dependence on such determination, decrypting whichever of the first or second encrypted data corresponds to the fourth key identifier and re-encrypting the decrypted data using the first encryption key that corresponds to the younger of the first or second encryption keys.

6. The method of claim 5 further comprising:
   at the transaction server,
   receiving the first payment token;
   receiving the second and the third key identifiers;
   encrypting the first payment token with the encryption key associated with the second key identifier; and
   inputting the encrypted first payment token into a data record entry corresponding to the first payment token, said entry further corresponding to the second key identifier, where the first and second key identifiers are numerically distinct and the first- and second encryption keys are numerically distinct.

7. The method of claim 5 further comprising:
   at the transaction server,
   determining if neither the first nor second key identifiers match either the third or fourth key identifiers, and in dependence thereon, requesting from a remote server and receiving from said remote server encrypted forms of the third decryption key and the fourth decryption key corresponding to the third and fourth key identifiers.

8. The method of claim 7 further comprising: preventing the key rotation and the rekeying until the system detects a condition that the request from said remote server step returns a null result instead of the third and fourth decryption keys.

* * * * *